United States Patent
Laitinen et al.

(10) Patent No.: US 7,666,281 B2
(45) Date of Patent: Feb. 23, 2010

(54) METHOD AND DEVICE FOR TREATING WATER

(75) Inventors: Ilkka Olavi Laitinen, Gammelby (FI); Teppo Nurminen, Vantaa (FI); Mauri Salmisuo, Tuusula (FI)

(73) Assignee: STERIS Europe Inc. Suomen Sivuliike, Tuusula (FI)

( * ) Notice: Subject to any disclaimer, the term of this patent is extended or adjusted under 35 U.S.C. 154(b) by 403 days.

(21) Appl. No.: 10/556,865

(22) PCT Filed: May 12, 2004

(86) PCT No.: PCT/FI2004/000283
§ 371 (c)(1), (2), (4) Date: Jun. 30, 2006

(87) PCT Pub. No.: WO2004/101439
PCT Pub. Date: Nov. 25, 2004

(65) Prior Publication Data
US 2007/0131532 A1   Jun. 14, 2007

(30) Foreign Application Priority Data
May 16, 2003   (FI) ................... 20030736

(51) Int. Cl.
*B01D 1/22* (2006.01)
*B01D 1/26* (2006.01)
*B01D 3/28* (2006.01)
*C02F 1/04* (2006.01)

(52) U.S. Cl. .............. 203/10; 159/13.2; 159/17.1; 159/49; 159/901; 159/DIG. 8; 202/154; 202/155; 202/174; 203/22; 203/72; 203/78; 203/79; 203/89

(58) Field of Classification Search ............ 159/13.2, 159/17.1, 49, 901, DIG. 8; 202/153–155, 202/174; 203/10, 22, 27, 72, 78, 79, 89, 203/95–98, DIG. 16
See application file for complete search history.

(56) References Cited

U.S. PATENT DOCUMENTS 3,099,697 A   7/1963   Lustenader et al. ........... 202/64
3,849,259 A   11/1974  Steinbruchel ............... 202/174

(Continued)

FOREIGN PATENT DOCUMENTS

CA   2 236 479   5/1997

(Continued)

OTHER PUBLICATIONS

Hemming, Werner, "Verfahrenstechnik," p. 145, Würzburg: Vogel, 1984.

*Primary Examiner*—Virginia Manoharan
(74) *Attorney, Agent, or Firm*—Kusner & Jaffe; Michael A. Centanni

(57) ABSTRACT

Purified water for special purposes is produced using a falling-film multieffect evaporator. From the feed water, each effect produces a steam phase and a water phase. The steam phase is used for heating in the subsequent evaporating step, whereby the steam phase condenses to product water, and the water phase becomes feed water for the subsequent evaporation step. According to the invention, the product water may be wholly or partly recycled to the initial feed water, allowing process startup and sterilisation of the plant without conducting hot product water to the drain.

4 Claims, 1 Drawing Sheet

U.S. PATENT DOCUMENTS

| | | | |
|---|---|---|---|
| 3,875,017 A | 4/1975 | Saari et al. | 202/174 |
| 3,878,054 A | 4/1975 | Rodgers | 203/11 |
| 3,897,314 A | 7/1975 | Liebsch et al. | 203/89 |
| 3,926,739 A | 12/1975 | Izumi | 202/173 |
| 4,018,656 A * | 4/1977 | Rogers et al. | 203/11 |
| 4,166,773 A | 9/1979 | Higley et al. | 203/72 |
| 4,167,437 A | 9/1979 | Gilbert | 159/28 |
| 4,330,373 A | 5/1982 | Liu | 202/174 |
| 4,698,138 A | 10/1987 | Silvey | 203/91 |
| 4,938,868 A | 7/1990 | Nelson | 203/1 |
| 4,981,555 A | 1/1991 | Hohmann et al. | 159/13.2 |
| 5,139,620 A * | 8/1992 | Elmore et al. | 203/11 |
| 5,391,262 A | 2/1995 | Wilkerson, Jr. | 203/10 |
| 5,409,576 A | 4/1995 | Tleimat | 202/174 |
| 5,853,549 A | 12/1998 | Sephton | 203/2 |
| 5,972,171 A | 10/1999 | Ross et al. | 203/40 |
| 6,656,327 B2 | 12/2003 | Salmisuo | 203/10 |

FOREIGN PATENT DOCUMENTS

| | | |
|---|---|---|
| DE | 19928064 | 12/2000 |
| EP | 0610505 | 8/1994 |
| FI | 79790 | 11/1989 |
| JP | 10328501 | 12/1998 |
| WO | WO 02/24299 | 3/2002 |
| WO | WO2004/020066 | 3/2004 |

* cited by examiner

METHOD AND DEVICE FOR TREATING WATER

FIELD OF THE INVENTION

The invention relates to the production of highly purified water for special purposes. Particularly, the invention relates to the production of purified water using falling-film evaporators with subsequent condensation.

BACKGROUND OF THE INVENTION

For the purpose of this text, "purified water" means generally water of greater purity than ordinary potable water available from e.g. a municipal water distribution system. Highly purified water is required e.g. for various medical purposes, such as production of pharmaceuticals, and in the production of "water for injection", the quality of which is defined in official pharmacopoeias. Plants for producing such purified water may be designed as so-called multieffect stills, employing a series of falling film evaporators. A falling film evaporator comprises a vertical bundle of evaporation tubes enclosed into a heating jacket. Water fed into the evaporating tubes at their upper end flows down the inner surface of the tubes, at least partly evaporating and forming steam, which emerges at the lower ends of the tube bundle together with any un-vaporized water. In many devices for producing highly purified steam or water, the flow of steam after exiting the evaporation tubes makes a 180° turn and flows upwards in a rising space provided therefore while the remaining water collects at the bottom of the device.

The upward-flowing steam may, depending on the type of device, undergo various kinds of demisting and/or purification operations, whereby the separated droplets and impurities finally join the water phase at the bottom of the effect while the steam enters the heating jacket of the subsequent effect. The water phase becomes the feed water of the subsequent effect and the steam condenses, giving off its heat to cause more steam to evaporate from the feed water, and the cascade continues until the last effect is reached. The combined condensates from the heating jackets, together with the steam from the last effect, are cooled and condensed respectively, in a final heat exchanger to form the purified product water.

In this context, a reject stream is a stream of water that is permanently removed from the process. Generally, the stream is liquid water, but may be a steam-liquid mixture. A continuous process for producing pure water by evaporation must include the removal of a sufficient amount of reject water to carry away the separated impurities. The ratio of reject water to product water is an important aspect of the efficiency of the process. It follows from the material balance, that if the reject stream is insufficient, the impurities either accumulate in the device or leave with the product, which both alternatives are highly undesirable.

A plant for production of purified water should be able to work continuously and respond rapidly to fluctuations in consumption. A falling film plant basically requires a certain period to adapt to an increase in demand. As more primary heat is put in, it takes some time until the heat has propagated through the different effects and resulted in more steam, which is then condensed to pure water. If the plant is constantly operated at full effect, purified water may have to be discarded, which is not efficient in terms of energy consumption. If the plant is shut down, cooling medium is consumed, and a subsequent startup again consumes energy. In Finnish patent 79790, a method and device are described for decreasing the required amount of feed water by splitting the residual water from the final effect in a plant for the production of purified steam or water into a reject stream and a re-circulation stream, which is added to the feed water stream.

SUMMARY OF THE INVENTION

A falling-film evaporation plant for the production of purified water may comprise a plurality of evaporation stages or effects. Water is fed to each effect, and water and steam leave each effect. The heat in the steam leaving a particular effect is used to evaporate a further portion of water in the subsequent effect, whereby the steam condenses. The above-identified steps are then repeated for each subsequent evaporation effect. The combined condensed steam phases, including the separately condensed steam generated in the final effect, constitute the purified product water.

According to the present invention, at least part of the product water is conducted to a loop connected to the initial feed water intake. The plant may thus be operated in a continuous re-circulation mode, whereby the product water is returned as feed water to the beginning of the process. The plant as a whole can thus operate in a steady state, in which only an amount of feed water sufficient to compensate for the reject stream, required to carry the separated impurities, enters the circuit.

This state can be used e.g. during startup. As product water is drawn for consumption through the product line branching off from the circuit, a corresponding amount of feed water is allowed to enter. A control system provides for an adequate supply of primary heat as the load varies.

The re-circulation mode also provides a possibility to sanitize the feed and product section. Water can be circulated through the intake line, through the evaporation stages and via the product heat exchanger at a temperature and for a time period sufficient to ensure complete sterility.

BRIEF DESCRIPTION OF THE DRAWING

The invention is more thoroughly disclosed in the following, with reference to the appended FIGURE, which schematically shows the main components of a plant according to the invention.

DISCLOSURE OF THE INVENTION

Figure 1:
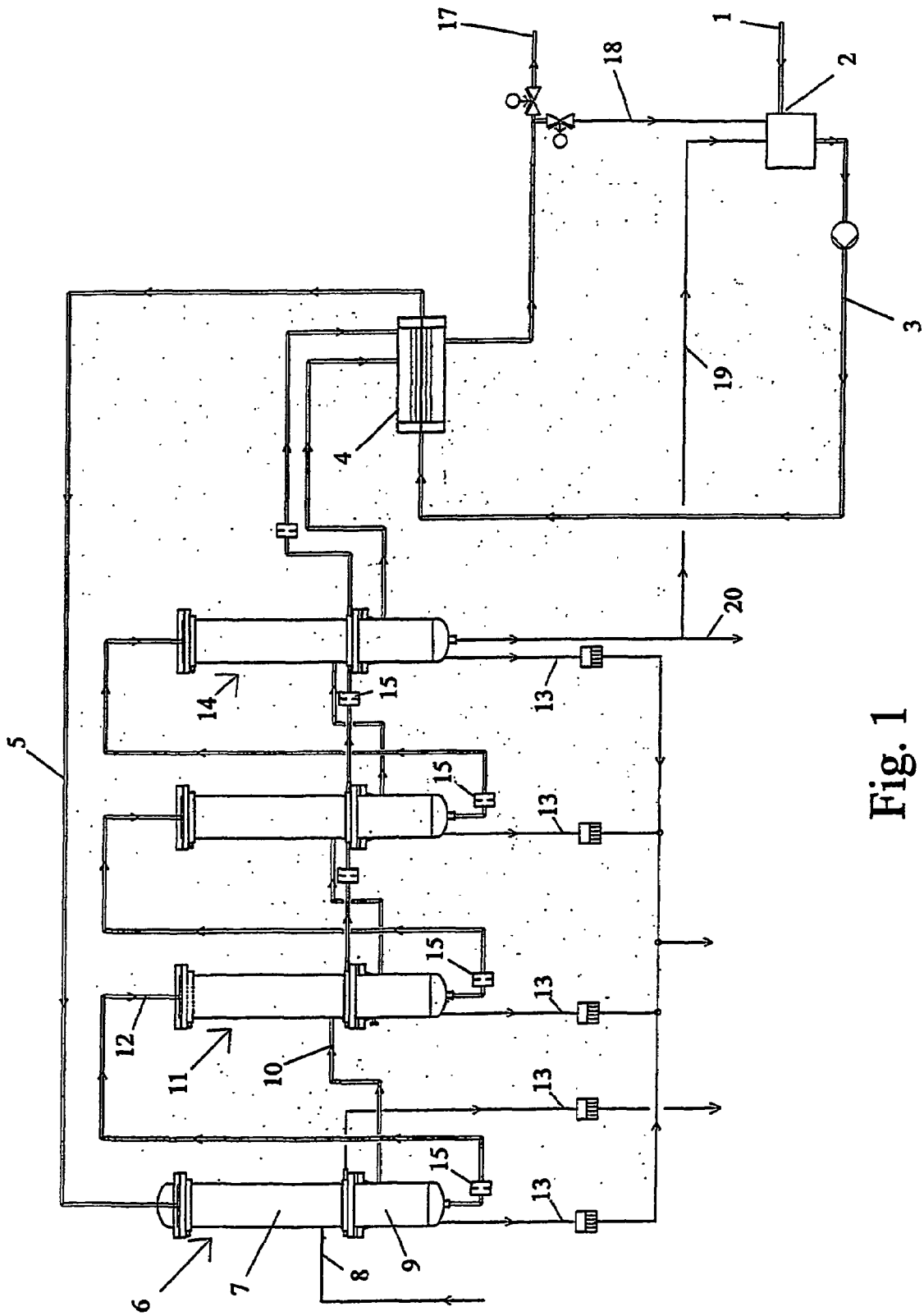

FIG. 1 shows an embodiment of a four-effect production plant for pure water according to the invention. Feed water, preferably purified by means of filtering and ion exchange or other appropriate methods, enters at inlet 1 via feed valve 2 into a feed circuit 3. After passing heat recovery exchanger 4, the feed stream enters, through transfer line 5, the first falling-film evaporation unit 6. Transfer line 5 may be provided with additional heat exchange devices to improve the overall heat recovery, as the skilled person may contemplate. Plant steam or another primary heat transfer medium (electrical heating may also be employed) entering at inlet 8 heats the shell side of the falling film evaporation section 7. As the feed water runs down as a film on the inner walls of the evaporating tubes (not shown), the water partly evaporates into steam, which emerges from the lower end of the tubes together with the remaining water.

The steam is separated from the water phase in separation section 9, and conducted in line 10 to the shell side of the subsequent evaporation stage 11, and the water phase constitutes the feed water, entering at inlet 12, of subsequent evaporation stage 11. Reject streams 13 may be withdrawn from each effect, advantageously according to a co-pending patent application Ser. No. 10/556,864, or from the last effect 14 only, in accordance with the prior art.

Each effect produces steam, and from the second effect 11 onward to the last effect, the steam from the previous effect is condensed to product water, simultaneously causing more of the feed water to evaporate. The temperature and pressure are at their maximum levels in the first effect, corresponding to the temperature of the initial heat source, and decrease towards the final effect.

Appropriate throttling devices 15 may be provided between effects. The steam from the last effect is condensed in the recovery heat exchanger 4, in which the combined condensates from previous effects may also be cooled. The product water can be withdrawn for use at outlet 17, or according to the invention it can enter the feed loop 18, 3 for re-circulating to the beginning of the process. Fresh feed water is supplied at 1, the amount corresponding to the sum of the withdrawn product water and the reject stream. The feed water intake may be controlled by a float valve.

In the embodiment shown, the residual water from the final effect may also be conducted to the feed loop via line 19. This is feasible because of the withdrawal of an impurity-containing reject stream from each effect in the embodiment shown; impurities are not enriched in the final residual water. The final residual water may also be expelled with the reject stream, or split between re-circulation and reject stream (outlet 20) according to the prior art. Outlets (not shown) for non-condensable soluble gases may be provided as required, e.g. at the upper end of evaporation sections.

For sterilization purposes, the temperature in the feed loop 18,3, including feed valve 2, can be increased to a sufficient level for a sufficient time, utilizing e.g. the heat of the product water. The required duration and temperature vary depending on the circumstances, but are readily determined by the skilled person.

When starting up the plant, water may be circulated through the process with a minimum reject stream and compensating makeup water. The operating temperature can be rapidly reached, and the apparatus sterilized throughout as the temperature in all sections is allowed to rise to a sufficient sterilization temperature for a sufficient period of time.

The invention claimed is:

1. A method for operating a multi-effect falling-film evaporation plant for the production of purified water, said method comprising the steps of:
   a) supplying a feed water to a feed water inlet of a first falling-film evaporation effect in a multi-effect falling-film evaporation plant;
   b) evaporating the feed water in the first falling-film evaporation effect to form a steam and a residual water;
   c) circulating the residual water to a subsequent falling-film evaporation effect as a feed water;
   d) circulating the steam to the subsequent falling-film evaporation effect to heat the feed water in the subsequent falling-film evaporation effect thereby forming an additional steam and an additional residual water;
   e) condensing a portion of the steam circulated to the subsequent falling-film evaporation effect to form a purified water;
   f) repeating steps c)-e) for each subsequent falling-film evaporation effect;
   g) forming a combined purified water by combining the steams produced in a second falling-film evaporation effect onward to said final falling-film evaporation effect; and
   h) circulating the combined purified water to the feed water inlet of the first falling-film evaporation effect.

2. A method for operating a multi-effect falling-film evaporation plant for the production of purified water, said method comprising the steps of:
   a) supplying a feed water to a feed water inlet of a first falling-film evaporation effect in a multi-effect falling-film evaporation plant; and
   b) circulating a portion of a purified water from a final falling-film evaporation effect to the feed water inlet of the first falling-film evaporation effect wherein at least part of a residual water from the final falling-film evaporation effect is returned to the feed water inlet of the first falling-film evaporation effect.

3. A device for the production of purified water, said device comprising:
   a plurality of effects for generating steam from feed water, each effect comprising:
      a housing,
      a feed water inlet connected to said housing for supplying feed water to said housing,
      a heat transfer medium inlet connected to said housing for supplying a heat transfer medium to said housing,
      a steam outlet connected to said housing for removing steam from said housing,
      a purified water outlet connected to said housing for removing purified water from said housing, and
      a residual water outlet connected to said housing for removing residual water from said housing;
   means for condensing the steam from a final falling-film evaporation effect into purified water; and
   a circuit for combining the purified water formed in a second falling-film evaporation effect onward to said final falling-film evaporation effect to form a combined purified water and for re-circulating the combined purified water to a feed water inlet of said first falling-film evaporation effect.

4. A device for the production of purified water, said device comprising:
   a plurality of effects for generating steam from feed water, each effect comprising:
      a housing,
      a feed water inlet connected to said housing for supplying feed water to said housing,
      a heat transfer medium inlet connected to said housing for supplying a heat transfer medium to said housing,
      a steam outlet connected to said housing for removing steam from said housing, and
      a residual water outlet connected to said housing for removing residual water from said housing;
   means for condensing the steam into purified water; and
   a circuit for re-circulating the purified water from a final falling-film evaporation effect to said feed water inlet of a first falling-film evaporation effect wherein a residual water outlet of the final falling-film evaporation effect is connected to an additional inlet in the circuit.

* * * * *

UNITED STATES PATENT AND TRADEMARK OFFICE
CERTIFICATE OF CORRECTION

| | |
|---|---|
| PATENT NO. | : 7,666,281 B2 |
| APPLICATION NO. | : 10/556865 |
| DATED | : February 23, 2010 |
| INVENTOR(S) | : Laitinen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this

Seventh Day of December, 2010

David J. Kappos
*Director of the United States Patent and Trademark Office*